United States Patent [19]

Bulmer et al.

[11] Patent Number: 4,968,110

[45] Date of Patent: Nov. 6, 1990

[54] APPARATUS AND METHOD FOR OPTIMIZING THE MODULATION EFFICIENCY OF A REMOTELY-LOCATED, POLARIZATION-SENSITIVE, INTEGRATED OPTIC MODULATOR WHICH IS ADDRESSED WITH A NON-POLARIZATION-PRESERVING FIBER

[75] Inventors: Catherine H. Bulmer, Springfield; William K. Burns, Alexandria; Alan D. Kersey, Springfield, all of Va.

[73] Assignee: The United States of America as represented by the Secretary of the Navy, Washington, D.C.

[21] Appl. No.: 472,934

[22] Filed: Jan. 31, 1990

[51] Int. Cl.$^5$ .......................... G02B 6/10; G02B 6/02; G02B 5/30

[52] U.S. Cl. .............................. 350/96.14; 350/96.17; 350/96.29; 350/320; 350/374

[58] Field of Search ............... 350/96.11, 96.13, 96.14, 350/96.15, 96.17, 96.29, 96.30, 320, 374, 384; 250/227.11; 356/350

[56] References Cited

U.S. PATENT DOCUMENTS

| | | | |
|---|---|---|---|
| 4,273,411 | 6/1981 | Alferness | 350/96.14 |
| 4,291,939 | 9/1981 | Giallorenzi et al. | 350/96.14 |
| 4,474,429 | 10/1984 | Yoldas et al. | 350/320 |
| 4,530,603 | 7/1985 | Shaw et al. | 350/96.29 X |
| 4,674,829 | 6/1987 | Bulmer et al. | 350/96.14 |
| 4,691,984 | 9/1987 | Thaniyavarn | 350/96.14 |
| 4,752,120 | 6/1988 | Shimizu | 350/96.14 X |
| 4,842,358 | 6/1989 | Hall | 350/96.15 |
| 4,856,094 | 8/1989 | Heidrich et al. | 350/96.13 X |
| 4,898,441 | 2/1990 | Shimizu | 350/96.14 |
| 4,907,849 | 3/1990 | Kersey et al. | 350/96.14 |

*Primary Examiner*—Brian Healy
*Attorney, Agent, or Firm*—Thomas E. McDonnell; George Jameson

[57] ABSTRACT

An apparatus and method are disclosed for optimizing the modulation efficiency of a remotely-located, polarization-sensitive, integrated optic modulator which is addressed with a non-polarization preserving fiber link. In a preferred embodiment of the invention, the polarization state of an input light beam is changed as a function of first and second control signals that are applied to the polarization controller. The non-polarization preserving fiber link conveys the light beam with the changed polarization state to the integrated optic modulator. The integrated optic modulator modulates the light beam with the changed polarization state as a function of any information signal to develop an intensity modulated optical signal. If no information signal is present, the optical signal from the modulator is not modulated. An output fiber conveys the optical signal from the integrated optic modulator to a locally-positioned detector for detection. In response to this input optical signal, the detector develops a first electrical signal that has a peak-to-peak amplitude proportional to any information signal and a second electrical signal proportional to the mean of the optical signal. This second electrical signal is utilized by a control means to controllably develop first and second control signals which force the polarization controller to change the polarization state of the input light beam so that the light beam at the input of the integrated optic modulator is maintained in a preselected polarization state in order to maintain the modulation efficiency of the integrated optic modulator at its optimum level.

12 Claims, 3 Drawing Sheets

APPARATUS AND METHOD FOR OPTIMIZING THE MODULATION EFFICIENCY OF A REMOTELY-LOCATED, POLARIZATION-SENSITIVE, INTEGRATED OPTIC MODULATOR WHICH IS ADDRESSED WITH A NON-POLARIZATION-PRESERVING FIBER

BACKGROUND OF THE INVENTION

1. Field of the Invention

The present invention relates to integrated optic modulators and particularly to an apparatus and method for controlling the polarization state of light propagated through a non-polarization-preserving fiber to a remotely-located integrated optic modulator so that the polarization state of the light arriving at the input of the integrated optic modulator is maintained in the particular state required for optimum operation of the integrated optic modulator.

2. Description of the Prior Art

Most active integrated optic modulators require a stable predefined input state of polarization (SOP) to operate with optimum efficiency. As a result, a high birefringence polarization-preserving fiber is generally used to provide light with that required stable SOP to the input of an integrated optic modulator. This use is especially significant if the integrated optic modulator is used in a remote sensing or a communications system where remote interrogation of the modulator may occur through a very long fiber link (i.e., from hundreds of meters to several kilometers in length).

A high birefringence fiber is much more expensive than conventional low birefringence fiber. To allow the use of the less expensive low birefringence fibers in the above-named systems, polarization-independent modulators have been developed and used. These polarization-independent modulators use two-electrode structures in order to equally modulate each of the TE and TM polarization modes of the modulator. Since the geometry for a two-electrode structure is more complicated than that for a one-polarization or polarization-sensitive modulator, higher modulation voltages are required, i.e., for a given input voltage, the modulation efficiency is reduced.

OBJECTS OF THE INVENTION

Accordingly, it is an object of this invention to provide an apparatus and method for interrogating a remotely-located, integrated optic modulator over a low birefringence fiber using polarization tracking.

Another object of this invention is to provide an apparatus and method for optimizing the modulation efficiency of a remotely-located, integrated optic modulator which is addressed with a non-polarization-preserving fiber.

Another object of this invention is to provide an apparatus and method for interrogating a remote integrated optic modulator over a non-polarization-preserving fiber using polarization tracking to optimize the operation of the integrated optic modulator.

A further object of this invention is to provide an apparatus and method for controlling the polarization state of light propagated through a non-polarization-preserving fiber to a remotely-located, integrated optic modulator so that the polarization state of the light arriving at the input of the integrated optic modulator is maintained in the particular state required for optimum operation of the integrated optic modulator.

SUMMARY OF THE INVENTION

These and other objects of this invention are achieved by providing an apparatus and method for optimizing the modulation efficiency of a polarization-sensitive, integrated optic modulator, which is addressed with a non-polarization preserving fiber, by: utilizing a polarization controller to change the polarization state of an input light beam as a function of first and second control signals; propagating the input light with the changed polarization state through the non-polarization-preserving fiber to the input of the integrated optic modulator; developing an intensity modulated optical signal at the output of the integrated optic modulator in response to the application of an information signal and the input light signal with the changed polarization state; detecting the intensity modulated signal to develop an electrical signal; and using the electrical signal to controllably develop first and second control signals which force the polarization controller to change the polarization state of the input light beam so that the input light beam at the input of the integrated optic modulator is maintained in a preselected polarization state to maintain the modulation efficiency of the integrated optic modulator at its optimum level.

The fundamental concept of the invention relies on the fact that the desired polarization mode for the light at the integrated optic modulator (or other integrated optic device), which in this discussion is the TE mode because it has greater modulation sensitivity than the TM mode, has a lower modulator throughput loss than the TM mode. Hence, when a feedback circuit operates to change the polarization so that the modulator mean optical output (optical output with no information signal or average output with modulation) is maximized, the modulator is automatically set for optimum sensitivity (maximum output modulation for a given input voltage) with light in the TE mode propagating through the modulator.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE PREFERRED EMBODIMENT

Figure 1:
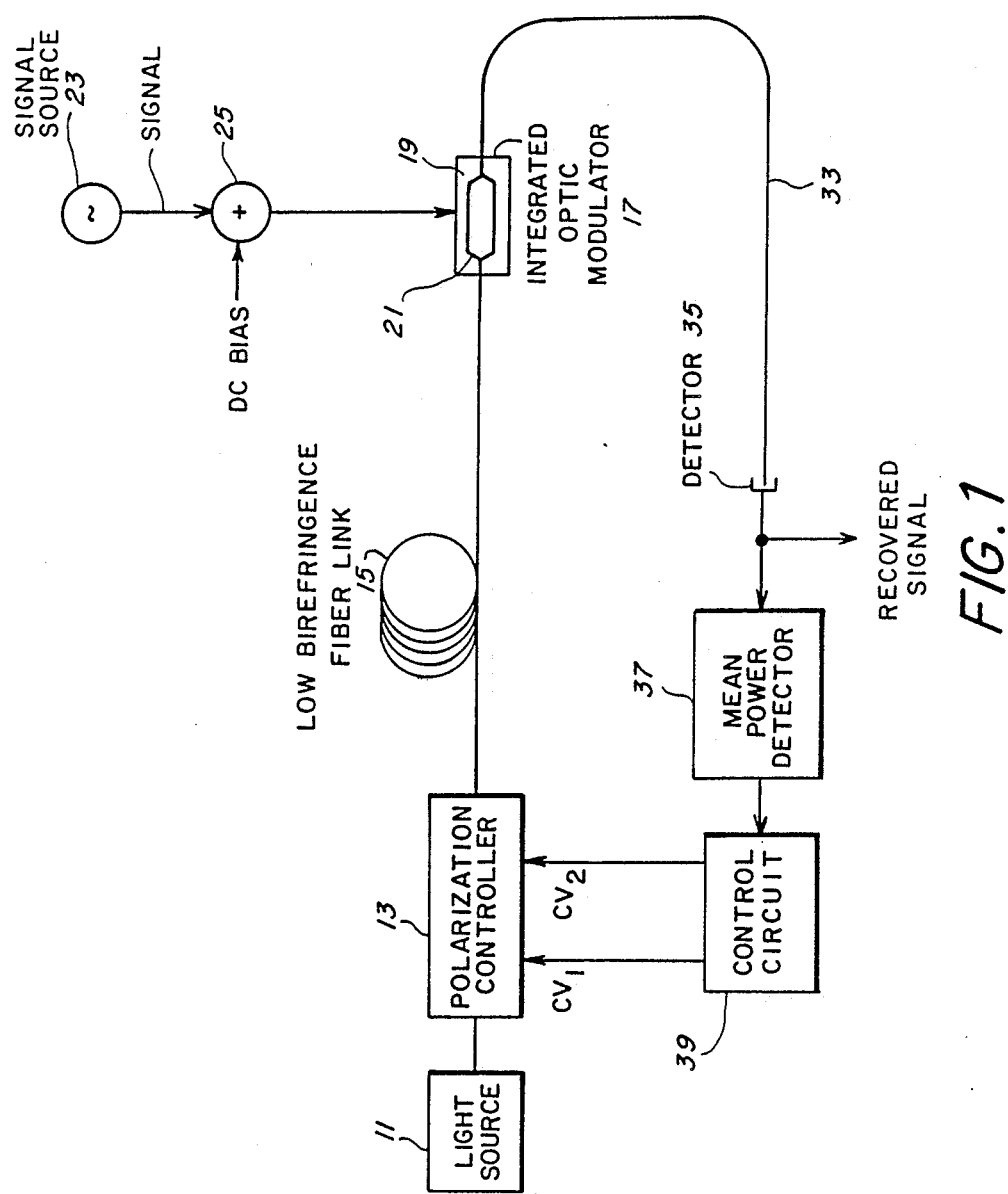
FIG. 1 illustrates a schematic block diagram of a preferred embodiment of the invention.

Referring to FIG. 1, a schematic block diagram of a preferred embodiment of the invention will now be discussed.

A light source or laser 11 passes an input light beam through a polarization controller 13. Although not shown, the light source 11 may include an isolator at its output to prevent light from being reflected back into the source 11. The polarization controller 13, which is a device well known in the art, is formed using two lengths or sections of internal-stress-induced high birefringence fiber (not shown) which are wound on separate piezoelectric cylinders (not shown) and spliced together with their polarization axes rotated at 45 degrees with respect to each other.

Basically, the polarization controller 13 changes the polarization state or SOP of the input light beam from source 11 as a function of control voltages $CV_1$ and $CV_2$ that are respectively applied to the two piezoelectric cylinders in the controller 13. Each of the control voltages $CV_1$ and $CV_2$ rotates the polarization state of the input light beam about an associated axis. The control voltages applied to the two piezoelectric cylinders allow the strain, and thus the birefringence, in the high birefringence sections to be adjusted to produce any output state of polarization (SOP).

The polarization controller 13 is spliced to a non-polarization-preserving or low birefringence fiber link 15, which may have an exemplary length of 600 meters. The light with the changed polarization state at the output of the polarization controller 13 propagates through the low birefringence fiber link 15 to a remotely-located integrated optic (IO) modulator 17. The particular type of IO modulator shown in FIG. 1 is an IO Mach-Zehnder modulator, but any other suitable IO device having a differential in loss between the TE and TM polarizations could be used (such as the integrated IO device shown in FIG. 3—to be discussed).

The IO Mach-Zehnder modulator 17 is formed in a suitable electro-optic substrate, such as a lithium niobate ($LiNbO_3$) crystal 19. The $LiNbO_3$ substrate 19 is shown as an exemplary X-cut (crystal orientation) for Y-directed propagation. Titanium (Ti) is diffused into the X-cut, Y-propagating $LiNbO_3$ substrate 19 by conventional diffusion techniques, such as error function diffusion or Gaussian diffusion, to form a Mach-Zehnder waveguide configuration 21 for light to propagate therethrough in the Y-direction. However, any modulator formed in any orientation of $LiNbO_3$ could be used. Furthermore, any active IO device (in $LiNbO_3$ or in another ferroelectric material) could be used, provided that the device shows some differential between the throughputs for the two mode polarizations, TE and TM.

The above-described IO Mach-Zehnder modulator 17 operates most efficiently with the TE mode input, since the modulation voltage for the TE mode is approximately one third of that for the TM mode, ($V_\#(TE) \approx V_\#(TM)/3$), because of the difference in electro-optic coefficients seen by the two polarizations. The modulator 17 has a short (0.5 meter) high birefringence fiber pigtail (not shown), with one polarization axis of the fiber pigtail being aligned with the plane of the waveguide configuration 21. Thus, the fiber pigtail could be considered an extension of the waveguide configuration 21. However, it should be noted that the pigtail is not necessary for the operation of the present invention. In the general case the low birefringence fiber link 15 extends up to the substrate 19 of the modulator 17.

Figure 2:
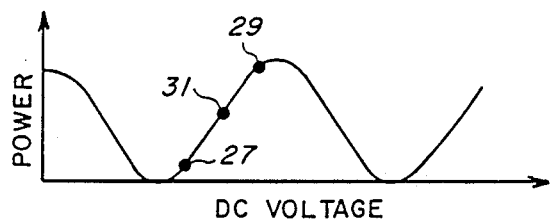
FIG. 2 illustrates the sinusoidal type of transfer function of the integrated optic Mach-Zehnder modulator of FIG. 1 when a voltage is applied.

An input electrical information signal from a signal source 23 can be directly applied to the integrated optic modulator 17 to modulate the input light beam, or carrier light beam, that is passing through the IO modulator 17. In communications applications, this input electrical information signal can be, for example, in the form of a very high rate data signal, a data stream of bits or a radio frequency signal. In sensing applications, this input electrical information signal can be, for example, an electric field signal derived from electric field sensing. The IO modulator 17 can be biased by a DC bias voltage, which is summed with the input electrical signal in a summer 25, to bias the IO modulator 17 to its most linear part. The modulator is biased to the most linear part of its transfer function. Although the modulator 17 is shown in FIG. 1 as being biased with a DC voltage, in some modulators such biasing is achieved passively by means of the modulator geometry. This type of IO modulator 17 usually shows a sinusoidal type of transfer function with the application of an input information signal, as indicated in FIG. 2. Note in FIG. 2 that points 27 and 29 define the outer limits of a linear portion of the transfer function shown. The DC bias voltage biases the IO modulator 17 to point 31 of FIG. 2, which is the center of this linear portion.

Under normal conditions, the SOP at the splice between the low birefringence fiber link 15 and the modulator pigtail of the IO modulator 17 will vary randomly, and the modulation efficiency of the IO modulator 17 will fluctuate accordingly. However, if the SOP of the light at this point is maintained in a linear state aligned with the correct polarization mode of the modulator pigtail, the modulation efficiency of the IO modulator will be maintained at its optimum level. It will be recalled that the above-described IO modulator operates most efficiently with a TE mode input. Thus, the desired SOP of light to be maintained at the input of the IO modulator 17 is that polarization state which excites the TE mode of the IO modulator 17. The control of the input SOP to the low birefringence fiber link 15 allows this objective to be achieved.

The optical output from the IO modulator 17 is propagated through an output low birefringence fiber or non-polarization-preserving fiber or fiber link 33 to a photodetector 35. In response to the optical output from the modulator 17, the photodetector 35 develops an electrical signal with two components: a DC component which has an amplitude proportional to the mean optical output of the modulator 17 and an AC component which has a peak-to-peak amplitude proportional to any information signal, which may or may not be present. The AC component is outputted as a recovered signal which contains the information derived from the signal from the signal source 23. The DC component from the detector 35 is applied to a mean power detector 37 to develop a mean power level which is used as an error signal. This resultant error signal is applied to a control circuit 39 to force the polarization controller 13 to control the polarization state of the light entering the low birefringence fiber link 15.

The control circuit 39 is responsive to the mean power error signal from the mean power detector 37 for developing and selectively adjusting the amplitudes of the control signals $CV_1$ and $CV_2$ to force the polarization controller 13 to change the polarization state of the input light to the input of the low birefringence fiber link 15, and hence change the polarization state of the light at the input of the integrated optic modulator 17, in order to maximize the amplitude of the error signal from the mean power detector 37. By maximizing the amplitude of the error signal, the system of FIG. 1 maximizes the throughput from the IO modulator 17 and maintains the polarization state of the light at the input to the IO modulator 17 with the correct horizontal polarization to excite the TE mode of the IO modulator 17. With the polarization state of the light at the input of the modulator 17 maintained in the TE mode of the modulator 17, the modulator 17 operates at its highest modulation efficiency. It should be noted that the mean power detector 37 and the control circuit 39 operate together to complete a feedback loop between the output of the photodetector 35 and the input of the polarization controller 13 to perform these operations.

Figure 3:
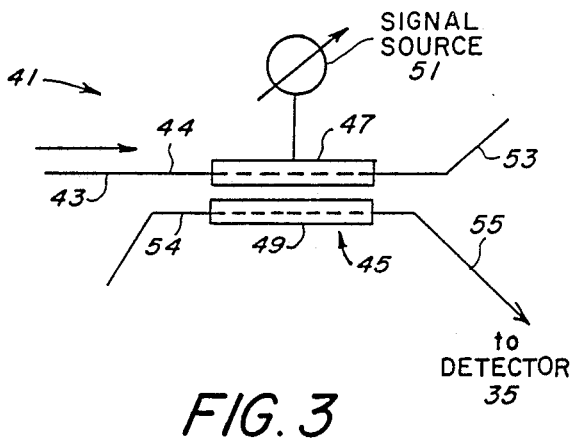
FIG. 3 illustrates another basic type of integrated optic device.

Referring now to FIG. 3, another basic type of integrated optic modulator device is illustrated. More specifically, an integrated optic directional coupler switch 41 is shown. In operation, light comes in port 43, travels along a waveguide 44 and enters a coupling region 45. Electrodes 47 and 49 are respectively disposed over the two waveguides 44 and 54 in the coupling region 45, with a variable signal applied from a DC or an AC signal source 51. Normally, the light entering port 43 would normally just exit from port 53. However, when a certain amplitude of voltage is applied to the electrode 47, the light in the coupling region 45 couples over to a second waveguide 54 and passes out port 55 to the photodetector 35 (FIG. 1). As a result, a sequence of light pulses will be outputted from port 55 to the detector 35 containing data as a function of the voltage changes produced by the variable DC source 51.

Figure 4:
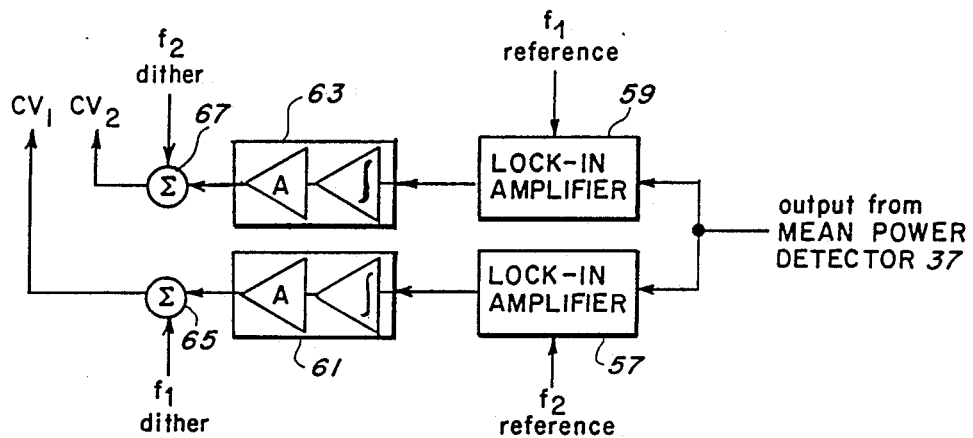
FIGS. 4 and 5 respectively illustrate two different implementations of the control circuit of FIG. 1.

A first implementation of the control circuit 39 of FIG. 1 is shown in FIG. 4. The error signal from the output of the mean power detector 37 (FIG. 1) is utilized to initiate action in the control circuit 39 to control the polarization state of the input light to the polarization controller 13. By dithering the $CV_1$ and $CV_2$ control voltages applied to the polarization controller 13 (FIG. 1) at different frequencies ($f_1$ and $f_2$), an error voltage related to the polarization mismatch between the polarization state of the input light and the desired polarization state at the input to the low birefringence fiber link 15 can be generated by the mean power detector 37 and fed back to the control circuit 39 to force the polarization controller 13 to adjust $CV_1$ and $CV_2$ and thus control the SOP of the light at the input to the IO modulator 17.

Referring now to FIG. 4, the error signal from the output of the mean power detector 37 is applied to each of lock-in amplifiers or synchronous detectors 57 and 59, which are respectively dithered by reference frequencies $f_1$ and $f_2$. Exemplary frequencies for $f_1$ and $f_2$ are 120 Hz and 200 Hz.

Essentially, amplifier 57 mixes the reference frequency $f_1$ with the error signal values from the mean power detector 37 to detect the modulation in the error signal values at the frequency $f_1$ induced by the dither $f_1$ applied to the control voltage $CV_1$ of polarization controller 13. Similarly, amplifier 59 mixes the reference frequency $f_2$ with the error signal values from the mean power detector 37 to detect the modulation in the error signal values at the frequency $f_2$ induced by the dither $f_2$ applied to the control voltage $CV_2$ of the polarization controller 13.

Integrator-amplifier circuits 61 and 63 are respectively responsive to the modulation outputs from amplifiers 57 and 59 for respectively generating filtered and amplified voltages proportional to the amount of modulation in the outputs of amplifiers 57 and 59. Summers 65 and 67 respectively combine the dither frequencies $f_1$ and $f_2$ with the voltage outputs from integrator-amplifiers 61 and 63 to derive the control signals $CV_1$ and $CV_2$.

Figure 5:
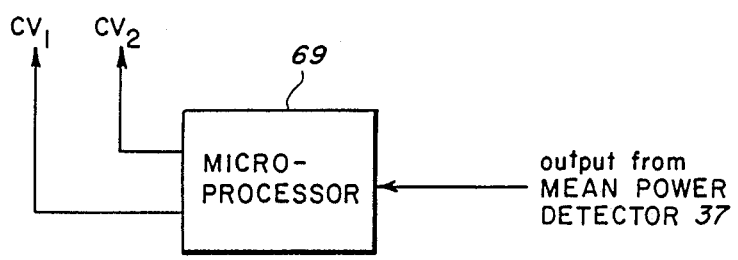

Referring now to FIG. 5, a second implementation of the control circuit 39 of FIG. 1 is shown. The implementation of FIG. 5 is very simple, comprising only a microprocessor, computer or computing device 69.

In response to the error signal from the mean power detector 37, the microprocessor 69 would operate according to an internally-stored routine or subroutine to sequentially adjust its $CV_1$ and $CV_2$ control voltage outputs to maximize the error voltage from the mean power detector 37. For example, the microprocessor 69 would operate to change $CV_1$ first. If the change in $CV_1$ causes the input error signal to the microprocessor 69 to decrease, the microprocessor 69 would make another incremental change in the value of $CV_1$. If that change in $CV_1$ produces an increase in the input error signal, the microprocessor 69 would continue that direction of change in $CV_1$. Microprocessor 69 would continue to incrementally change the value of $CV_1$ until the error signal is maximized by adjusting the $CV_1$. At that time, the microprocessor 69 would similarly incrementally adjust the value of the $CV_2$ control voltage until the error signal at its input is maximized by adjusting $CV_2$. AT that time the throughput would be at is maximum. The microprocessor 69 could then continue to adjust the values of $CV_1$ and $CV_2$ to maximize the throughput of the system. If so desired, the routine or subroutine of the microprocessor 69 could include another subroutine to impart individual dithering of the $CV_1$ and $CV_2$ control signals at desired dither frequencies.

Figure 6:
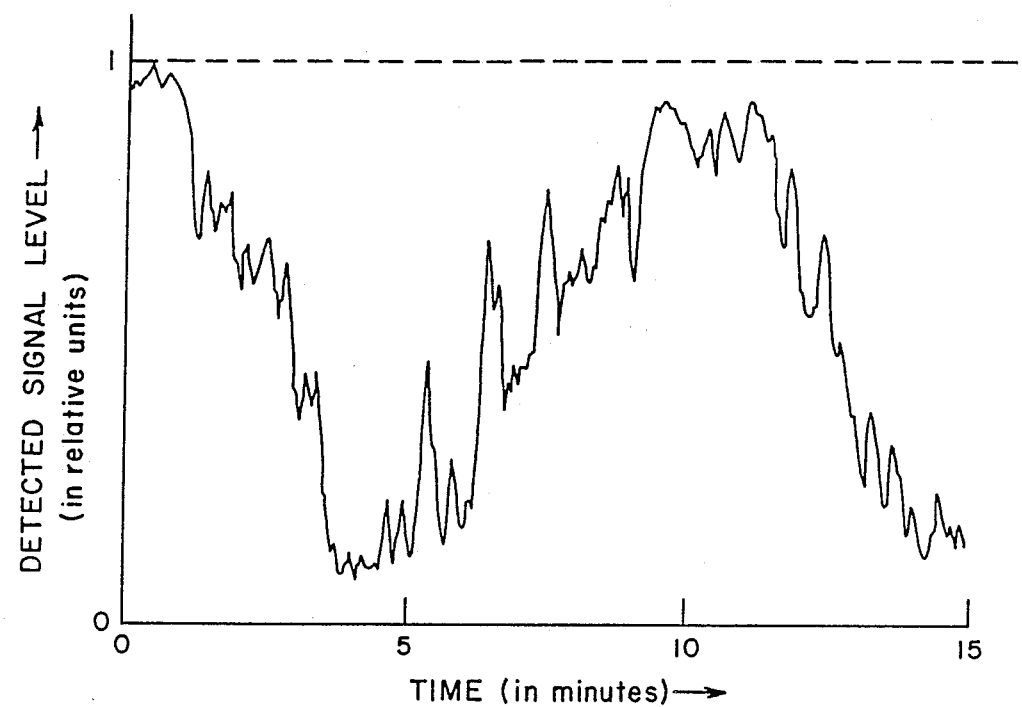
FIGS. 6 and 7 illustrate waveforms useful in explaining the operation of the preferred embodiment of FIG. 1.
Figure 7:
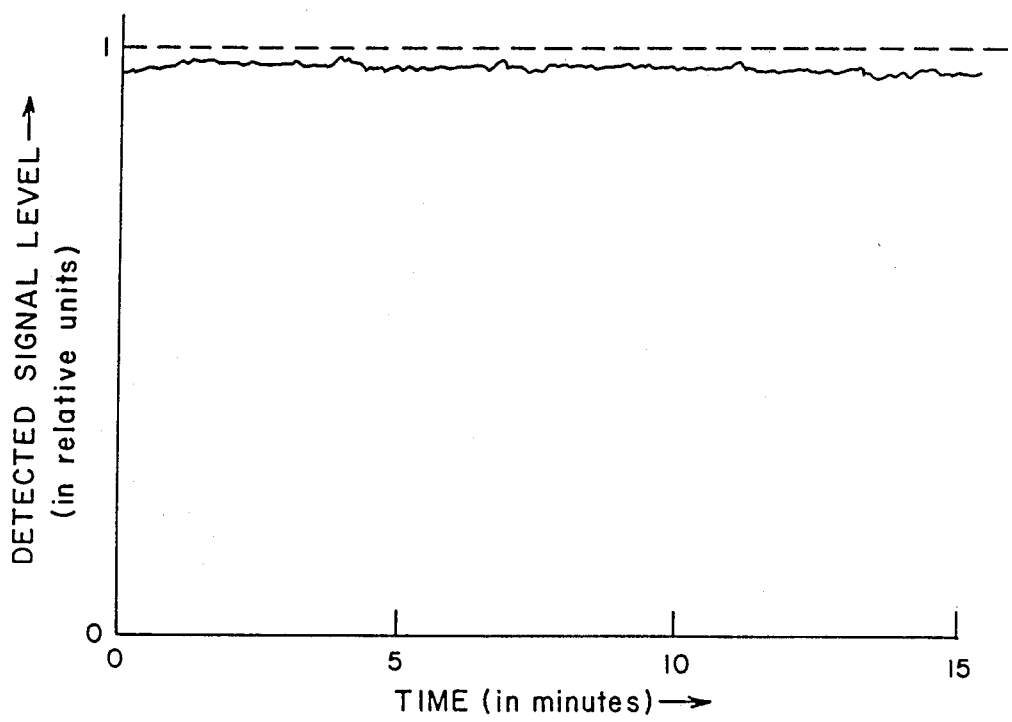

Referring now to FIGS. 6 and 7, waveforms are illustrated showing the operation of the polarization stabilization scheme of FIG. 1 using active input SOP control. Each of FIGS. 6 and 7 shows the detected signal level at the output of the photodetector 35 of FIG. 1. The modulator 17 was biased at its quadrature point (point 31 in FIG. 2) and a $-0.2$ radians peak signal, at a frequency of 100 kHz, was applied to the electrodes of the integrated optic modulator 17. The modulated output was detected by photodetector 35 and monitored at the output of the photodetector 35.

FIG. 6 shows the recorded level over a period of 15 minutes (min.) without the use of input SOP control. Note that the detected signal varies (fading up to $-20$dB) due to random fluctuations in the SOP arriving at the modulator 17.

FIG. 7 shows the result obtained when feedback control of the input SOP was used. Here it can be seen that the recovered signal level is substantially constant over the 15 minute period, with only a deviation of from $+2\%$ to $-2\%$.

Therefore, what has been described is an apparatus and method for controlling the polarization state of light propagated through a non-polarization-preserving fiber to a remotely-located integrated optic modulator so that the polarization state of the light arriving at the input of the integrated optic modulator is maintained in the particular state required for optimum operation of the integrated optic modulator. The fundamental concept of the invention relies on the fact that the desired polarization mode for the light at the integrated optic modulator (or other integrated optic device), which in this discussion is the TE mode because it has greater modulation sensitivity than the TM mode, has a lower modulator throughput loss than the TM mode. Hence, when a feedback circuit operates to change the polarization so that the modulator mean optical output (optical output with no information signal or average output with modulation) is maximized, the modulator is automatically set for optimum sensitivity (maximum output modulation for a given input voltage) with light in the TE mode propagating through the modulator.

It should therefore readily be understood that many modifications and variations of the present invention are possible within the purview of the claimed invention. For example, the polarization controller 13 (FIG. 1) requires two control voltages $CV_1$ and $CV_2$. Other polarization controllers, which require multiple control voltages, have also been reported in the art and could be used in this invention. In addition, the fundamental principles of the operation of the invention are not limited to $LiNbO_3$ modulators. Any optical waveguide device where one mode polarization shows a greater insertion loss than the other is appropriate. Typically there is always a difference in TE/TM throughputs, due to differences in mode dispersion and, hence, differences in mode dimensions. Similarly, the invention is not limited to polarization controllers fabricated from fibers. Any suitable controller in fiber or IO form may be used. Furthermore, the invention is not restricted to operation at any particular wavelength. It is therefore to be understood that within the scope of the appended claims, the invention may be practiced otherwise than as specifically described.

What is claimed and desired to be secured by Letters Patent of the United States is:

1. An apparatus for optimizing the modulation efficiency of a remotely-located, polarization-sensitive, integrated optic modulator device which is addressed with a non-polarization-preserving fiber link, said apparatus comprising:
   an optical source for providing a carrier light beam;
   a polarization controller for changing the polarization state of said carrier light beam as a function of first and second control signals applied to said polarization controller, said non-polarization-preserving fiber link conveying said carrier light beam with the changed polarization state to said integrated optic modulator device, said integrated optic modulator device being responsive to any information signal that may be present and to said carrier light beam with the changed polarization state for developing an optical output signal;
   photodetection means responsive to said optical output signal for developing an electrical signal that has a DC component signal which has an amplitude proportional to the mean of said optical output signal and an AC component signal which has a peak-to-peak amplitude proportional to any information signal that may be present; and
   control means responsive to said DC component signal for controllably developing said first and second control signals to force said polarization controller to change the polarization state of said carrier light beam so that said carrier light beam at the input of said integrated optic modulator device is maintained in a preselected polarization state in order to maintain the modulation efficiency of said integrated optic modulator device at its optimum level.

2. The apparatus of claim 1 wherein said photodetection means includes:
   a photodetector for developing said electrical signal; and
   an output fiber for conveying said optical output signal to said photodetector.

3. The apparatus of claim 2 wherein:
   said output fiber is a non-polarization-preserving fiber.

4. An apparatus comprising:
   a remotely-located, polarization-sensitive, integrated optic device;
   an optical source for providing a carrier light beam;
   a locally-located polarization controller for changing the polarization state of said carrier light beam as a function of first and second control signals applied to said polarization controller;
   a non-polarization-preserving fiber for conveying said carrier light beam with the changed polarization state from said locally-located polarization controller to said remotely-located, integrated optic device, said integrated optic device being responsive to any information signal that may be present and to said carrier light beam with the changed polarization state for developing an optical output signal;
   a second fiber for conveying said optical output signal from said remotely-located, integrated optic device;
   locally-located photodetection means responsive to said optical output signal from said second fiber for developing an electrical signal that has a DC component signal which has an amplitude proportional to the mean of said optical output signal and an AC component signal which has a peak-to-peak amplitude proportional to any information signal that may be present; and
   control means responsive to said DC component signal for controllably developing said first and second control signals to force said polarization controller to change the polarization state of said carrier light beam so that said carrier light beam at the input of said integrated optic device is maintained in a preselected polarization state in order to maintain the modulation efficiency of said integrated optic device at its optimum level.

5. The apparatus of claim 4 wherein:
   said integrated optic device comprises an integrated optic Mach-Zehnder modulator.

6. The apparatus of claim 4 wherein:
   said integrated optic device comprises an integrated optic directional coupler modulator.

7. The apparatus of claim 4 wherein said control means includes:
   a mean power detector responsive to said DC component signal for developing an error signal; and
   processing means responsive to said error signal for developing said first and second control signals.

8. The apparatus of claim 7 wherein said processing means includes:
   first and second means for respectively detecting first and second modulation components in said error signal; and
   first and second conditioning means for respectively changing said first and second modulation components to said first and second control signals.

9. The apparatus of claim 7 wherein said processing means includes:
   a microprocessor responsive to said error signal for developing said first and second control signals.

10. The apparatus of claim 4 wherein:
said optical source is a laser.

11. The apparatus of claim 4 wherein:
said second fiber is a second non-polarization-preserving fiber.

12. A method for optimizing the modulation efficiency of a remotely-located, polarization-sensitive, integrated optic modulator which is addressed with a non-polarization-preserving fiber, said method comprising the steps of:

utilizing a polarization controller to change the polarization state of an input light beam as a function of first and second control signals;

propagating the input light beam with the changed polarization state through the non-polarization-preserving fiber to the input of an integrated optic modulator;

developing an optical output signal in response to any information signal that may be present and to the input light beam with the changed polarization state;

detecting the optical output signal to develop an electrical signal that has a DC component signal which has an amplitude proportional to the mean of the optical output signal and an AC component signal which has a peak-to-peak amplitude proportional to any information signal that may be present; and using the DC component signal to controllably develop first and second control signals which force the polarization controller to change the polarization state of the input light beam so that the input light beam at the input of the integrated optic modulator is maintained in a preselected polarization state to maintain the modulation efficiency of the integrated optic modulator at its optimum level.

* * * * *